United States Patent
Legler

(10) Patent No.: US 11,119,742 B2
(45) Date of Patent: *Sep. 14, 2021

(54) CACHE EFFICIENT READING OF RESULT VALUES IN A COLUMN STORE DATABASE

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 78 days.

This patent is subject to a terminal disclaimer.

(21) Appl. No.: 16/565,254

(22) Filed: Sep. 9, 2019

(65) Prior Publication Data

US 2020/0004517 A1    Jan. 2, 2020

Related U.S. Application Data

(63) Continuation of application No. 15/973,058, filed on May 7, 2018, now Pat. No. 10,445,076.

(51) Int. Cl.
| | | |
|---|---|---|
| *G06F 12/08* | (2016.01) | |
| *G06F 8/41* | (2018.01) | |
| *G06F 12/0862* | (2016.01) | |
| *G06F 16/22* | (2019.01) | |
| *G06F 16/2455* | (2019.01) | |
| *G06F 12/0844* | (2016.01) | |

(52) U.S. Cl.
CPC ........ *G06F 8/4442* (2013.01); *G06F 12/0844* (2013.01); *G06F 12/0862* (2013.01); *G06F 16/221* (2019.01); *G06F 16/24552* (2019.01)

(58) Field of Classification Search
CPC .......................... G06F 12/0862; G06F 12/0844
USPC ........................................................ 711/118
See application file for complete search history.

(56) References Cited

U.S. PATENT DOCUMENTS 9,141,648 B1 * 9/2015 Birnbaum ......... G06F 16/24552
10,445,076 B1 * 10/2019 Legler ................... G06F 16/221

* cited by examiner

*Primary Examiner* — Than Nguyen
(74) *Attorney, Agent, or Firm* — Mintz Levin Cohn Ferris Glovsky and Popeo, P.C.

(57) ABSTRACT

A system for cache efficient reading of column values in a database is provided. In some aspects, the system performs operations including pre-fetching, asynchronously and in response to a request for data in a column store database system, a plurality of first values associated with the requested data. The request may identify a row of the column store database system associated with the requested data. The plurality of first values may be located in the row. The operations may further include storing the plurality of first values in a cache memory. The operations may further include pre-fetching, asynchronously and based on the plurality of first values, a plurality of second values. The operations may further include storing the plurality of second values in the cache memory. The operations may further include reading, in response to the storing the plurality of second values, the requested data from the cache memory.

18 Claims, 5 Drawing Sheets

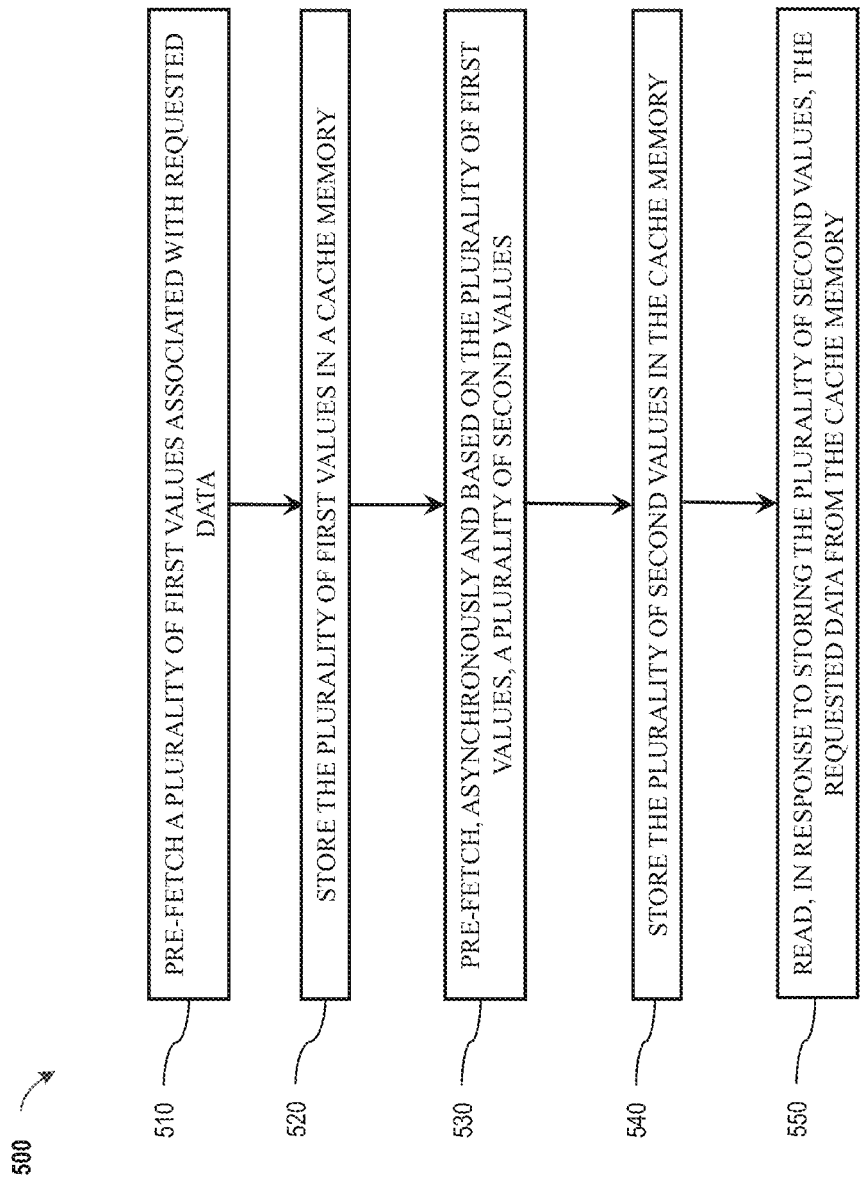

CACHE EFFICIENT READING OF RESULT VALUES IN A COLUMN STORE DATABASE

CROSS REFERENCE TO RELATED APPLICATIONS

The present application claims priority to U.S. patent application Ser. No. 15/973,058, filed May 7, 2018, entitled CACHE EFFICIENT READING OF RESULT VALUES IN A COLUMN STORE DATABASE, the disclosure of which is incorporated herein by reference in their entirety.

TECHNICAL FIELD

The subject matter described herein relates generally to database processing and, more specifically, to query execution and optimizing database performance in column store databases.

BACKGROUND

A database may be configured to store a plurality of electronic data records. The database may be coupled with a database management system (DBMS) that supports a variety of database operations for accessing the data records held in the database including, for example, structured query language (SQL) queries and/or the like. Performing a database operation may cause a cache miss if the database operation requires data that is absent from a cache memory. The cache miss may further trigger one or more accesses to a main memory in order to fetch the data required to perform the database operation. For example, the database operation may require data from a portion of an index such as, for example, a dictionary and/or the like, that is not found in the cache memory. As such, the main memory may be accessed in order to fetch the portion of the index required to perform the database operation.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include pre-fetching, asynchronously and in response to a request for data in a column store database system, a plurality of first values associated with the requested data. The request may identify a row of the column store database system associated with the requested data. The plurality of first values may be located in the row. The operations may further include storing the plurality of first values in a cache memory. The operations may further include pre-fetching, asynchronously and based on the plurality of first values, a plurality of second values. The operations may further include storing the plurality of second values in the cache memory. The operations may further include reading, in response to the storing the plurality of second values, the requested data from the cache memory.

In another aspect, there is provided a method. The method includes pre-fetching, asynchronously and in response to a request for data in a column store database system, a plurality of first values associated with the requested data. The request may identify a row of the column store database system associated with the requested data. The plurality of first values may be located in the row. The method may further include storing the plurality of first values in a cache memory. The method may further include pre-fetching, asynchronously and based on the plurality of first values, a plurality of second values. The method may further include storing the plurality of second values in the cache memory. The method may further include reading, in response to the storing the plurality of second values, the requested data from the cache memory.

In another aspect, there is provided a non-transitory computer program product storing instructions which, when executed by at least one data processor, causes operations which include pre-fetching, asynchronously and in response to a request for data in a column store database system, a plurality of first values associated with the requested data. The request may identify a row of the column store database system associated with the requested data. The plurality of first values may be located in the row. The operations may further include storing the plurality of first values in a cache memory. The operations may further include pre-fetching, asynchronously and based on the plurality of first values, a plurality of second values. The operations may further include storing the plurality of second values in the cache memory. The operations may further include reading, in response to the storing the plurality of second values, the requested data from the cache memory.

In some variations, one or more features disclosed herein including the following features may optionally be included in any feasible combination. For example, the operations and/or method may further include reading the plurality of first values, wherein the plurality of second values are associated with the plurality of first values in a dictionary. The operations and/or method may further include determining that a first value of the plurality of first values is associated with a second value in the plurality of second values. The first value and the second value may be associated with an attribute of the column store database system. The pre-fetching the plurality of second values may be based on the determining. The operations and/or method may further include receiving the request, the request identifying the row, the plurality of first columns, and the plurality of second columns of the column store database system associated with the requested data. In some aspects, the pre-fetching the plurality of first values includes retrieving the plurality of first values from a main memory of the at least one memory. The pre-fetching the plurality of first values may include retrieving each of the plurality of first values from a different database table of the column store database system. The pre-fetching the plurality of second values may include retrieving each of the plurality of second values from a database table associated with one of the plurality of first values.

The pre-fetching the plurality of second values may include retrieving dictionary entries associated with the plurality of first values, wherein the plurality of first values include value identifiers of the dictionary entries. The pre-fetching the plurality of first values may include triggering a first pre-fetch call and a second pre-fetch call sequentially and executing the first pre-fetch call in parallel with the second pre-fetch call. The pre-fetching the plurality of second values may include triggering a third pre-fetch call and a fourth pre-fetch call sequentially and executing the third pre-fetch call in parallel with the fourth pre-fetch call.

Implementations of the current subject matter may include methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a flowchart illustrating a process for machine learning based data management, in accordance with some example implementations.

When practical, similar reference numbers denote similar structures, features, or elements.

DETAILED DESCRIPTION

Database tables are generally stored by column or by row. Column store databases may vertically partition a database into a collection of individual data columns that are stored separately in a column-oriented structure. In row store DBMS, data is partitioned into row blocks that are stored separately.

Reading query results from a cache memory in a column store DBMS may involve more time and processing when compare to a row store DBMS. For example, after the evaluation of a database query, the DBMS may build a result set in response to the query. For the column store DBMS, the processing resources required for reading the result set may increase with the size of the result set and the number of relevant attributes. Accordingly, as result sets increase, so do the processing needs.

A database operation requiring data that is absent from the cache memory may cause a cache miss. The cache miss may trigger one or more accesses to a main memory in order to fetch the data absent from the processor cache. Such accesses to the main memory may increase the runtime of the database operation and may stall individual execution threads.

In some example embodiments, the column store DBMS may implement parallel pre-fetch operations to minimize cache misses and improve processing speeds and efficiency in memory reads. Pre-fetching may include fetching instructions or data from their original storage in slower memory, such as a main memory, to a faster local memory, such as a cache memory, before it is actually needed. For example, rather than wait for sequential accesses to the main memory during the cache miss, the DBMS may trigger parallel pre-fetch operations to retrieve data from different locations of the main memory that may be used in a later memory read. After the data from the pre-fetch operations has been retrieved and loaded into the cache, the DBMS may perform faster read operations on the data by reducing and/or eliminating the number of cache misses incurred in conventional database systems.

Figure 1:
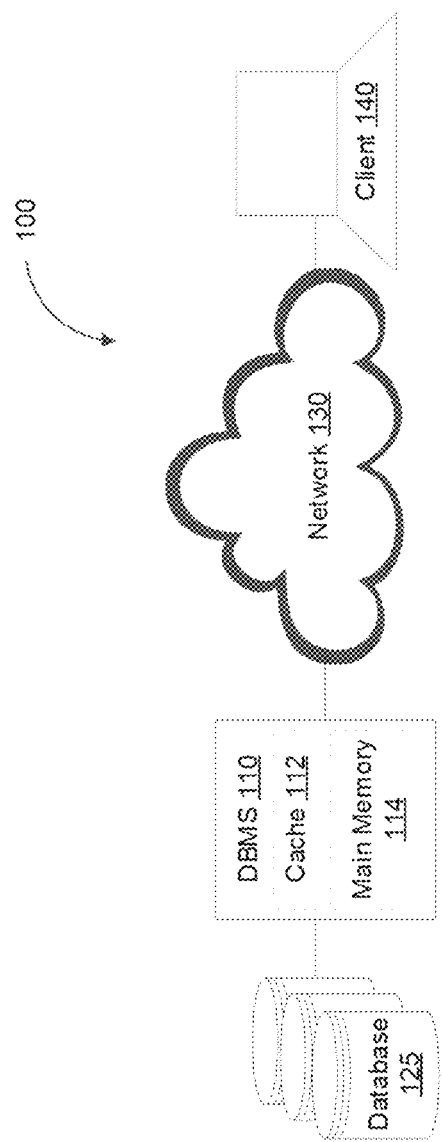
FIG. 1 depicts a system diagram illustrating an architecture of a database system, in accordance with some example embodiments.

FIG. 1 depicts a system diagram illustrating an architecture of a database system 100, in accordance with some example embodiments. Referring to FIG. 1, the database system 100 may include a database management system (DBMS) 110 and a database 125. As shown in FIG. 1, the database management system 110 may include a cache 112 and a main memory 114. The database management system 110 may support a variety of operations for accessing data held in the database 125. For instance, these operations may include structured query language (SQL) statements and/or the like. Meanwhile, the database 125 may be any type of persistence including, for example, data structures such as, for example trees, vectors, arrays, and/or the like, and/or databases such as, for example, including, for example, an in-memory database, a relational database, a non-SQL (NoSQL) database, and/or the like.

As shown in FIG. 1, the database management system 110 may be communicatively coupled, via a network 130, with one or more clients including, for example, a client 140. The client 140 may be any type of processor-based device including, for example, a wearable device, a smartphone, a tablet personal computer (PC), a desktop computer, a laptop computer, and/or the like. Meanwhile, the network 130 may be a wired and/or wireless network including, for example, a wide area network (WAN), a local area network (LAN), a public land mobile network (PLMN), the Internet, and/or the like.

The client 140 may interact with the database management system 110 in order to access data records stored at the database 125. For example, the client 140 may send, to the database management system 110, one or more requests to access the data records stored at the database 125. The database management system 110 may respond to these requests from the client 140 by performing one or more corresponding database operations. In some example embodiments, the database management system 110 may perform a database operation that requires data from the cache 112 and/or the main memory 114. For example, the database management system 110 may perform the database operation by accessing the cache 112 in order to locate the data required to perform the database operation. When the data required to perform the database operation cannot be found in the cache 112, a cache miss may occur and the database management system 110 may access the main memory 114 in order to fetch the data required to perform the database operation. Here, the database management system 110 may load, into the cache 112, the data fetched from the main memory 114. It should be appreciated that the accesses to the main memory 114, for example, to fetch data to perform database operations, may be unpredictable, thereby thwarting efforts to pre-fetch data from the main-memory 114.

A cache miss may incur a cache miss penalty including, for example, additional runtime for a database operation. The cache miss penalty may arise because accessing the main memory 114 to fetch data required to perform the database operation (e.g., an index join and/or the like) may increase the runtime of the database operation.

Figure 2:
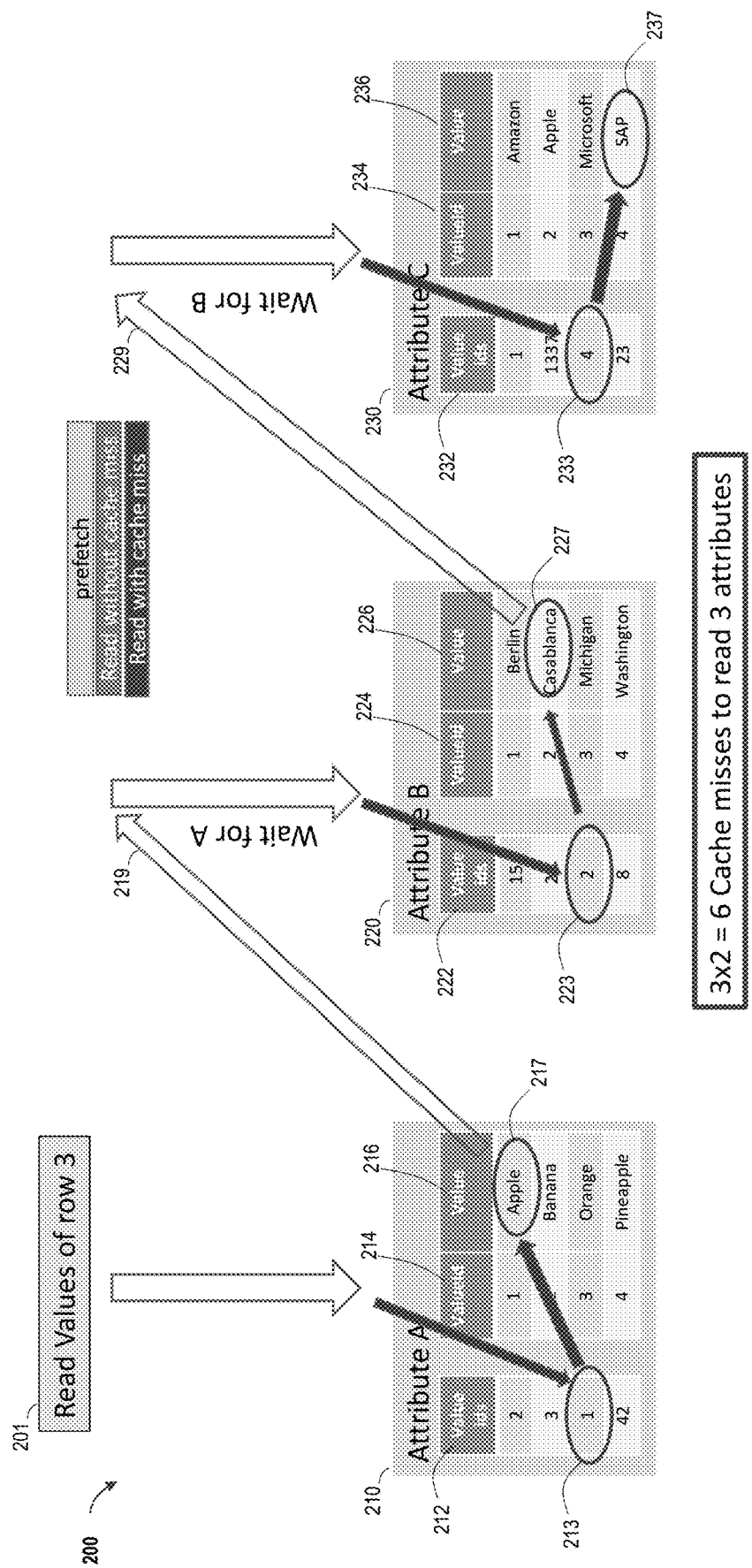
FIG. 2 depicts an example of a cache memory access, in accordance with some example implementations.

FIG. 2 depicts a diagram 200 of a cache read process of an example column store database, in accordance with some example implementations. As shown in FIG. 2, a database table may include an attribute 210 (Attribute A), an attribute 220 (Attribute B), and an attribute 230 (Attribute C). As further shown in FIG. 2, the attributes 210, 220, and 230 are stored in a compressed dictionary format. In compressed storage, values of a column may be referenced by an integer value identifier (valueID) and the mapping of valueIDs to the column values may be stored in an index vector and/or data dictionary. For example, the attribute 210 includes an index vector 212 which maps the values of a valueID column 214 to a value column 216. Similarly, the attribute 220 includes an index vector 222 which maps the values of a valueID column 224 to a value column 226 and the attribute 230 includes an index vector 232 which maps the values of a valueID column 234 to a value column 236.

As shown in FIG. 2, a column store DBMS, such as DBMS 110, may receive a request 201 to read row 3 of the attributes 210, 220, and 230. The DBMS 110 may first read the third row of index vector 212 of attribute 210 (Attribute A) to retrieve the value 213 which is the valueID "1." This first read of the index vector 212 may result in a first cache miss since the column value, such as a value of column 216, was not found in cache. After retrieving the value 213, the DBMS 110 may then perform a second read of the mapping of the valueID 1 in the valueID column 214 to a value in the value column 216. As shown in FIG. 2, the valueID 1 maps to the value 217 which is "Apple." However, this second read may result in a second cache miss since the column value 217 ("Apple") was not found in cache.

After the second read, the value 217 may be stored in cache and the DBMS 110 may then perform a third read to retrieve the value of the third row of attribute 220 (Attribute B). As shown in FIG. 2, after waiting for the read of the third row of attribute 210 (Attribute A), the DBMS 110 reads the third row of index vector 222 of attribute 220 (Attribute B) to retrieve the value 223 which is the valueID "2." This third read of the index vector 222 may result in a third cache miss since the column value, such as a value of column 226, was not found in cache. After retrieving the value 223, the DBMS 110 may then perform a fourth read of the mapping of the valueID 2 in the valueID column 224 to a value in the value column 226. As shown in FIG. 2, the valueID 2 maps to the value 227 which is "Casablanca." However, this fourth read may result in a fourth cache miss since the column value 227 ("Casablanca") was not found in cache.

After the fourth read, the value 227 may be stored in cache and the DBMS 110 may then perform a fifth read to retrieve the value of the third row of attribute 230 (Attribute C). As shown in FIG. 2, after waiting for the read of the third row of attribute 220 (Attribute B), the DBMS 110 reads the third row of index vector 232 of attribute 230 (Attribute C) to retrieve the value 233 which is the valueID "4." This fifth read of the index vector 232 may result in a fifth cache miss since the column value, such as a value of column 236, was not found in cache. After retrieving the value 233, the DBMS 110 may then perform a sixth read of the mapping of the valueID 2 in the valueID column 234 to a value in the value column 236. As shown in FIG. 2, the valueID 4 maps to the value 237 which is "SAP." However, this sixth read may result in a sixth cache miss since the column value 237 ("SAP") was not found in cache.

Accordingly, in a worst case scenario, such as shown in diagram 200, reading a row in a column store database table may result in two cache misses per attribute. In the example of FIG. 2, the read operation of row 3 resulted in six cache misses. As noted above, each cache miss may result in a cache miss penalty incurring in additional runtime processing and/or unnecessary idle time. In some aspects, the DBMS 110 may suspend the performance of other database operations until data required to perform the cache read operation is fetched from the main memory. Accordingly, runtime delays and increased processing due to cache misses may form a large portion of overall runtime processing costs.

In some implementations, cache reads may be optimized by pre-fetching data before performing read operations. Moreover, rather than performing sequential operations on a per attribute basis as in FIG. 2, the pre-fetching functions can be executed in parallel and across multiple attributes for more efficient use of processing resources. For example, the DBMS 110 may execute multiple pre-fetch calls asynchronously. Asynchronous execution of the pre-fetch calls may beneficially allow retrieval of data from main memory without waiting for other pre-fetch calls to complete. For example, when the DBMS 110 executes a first pre-fetch call for data in a first attribute, it may execute a second pre-fetch call for data in a second attribute immediately following the first pre-fetch call. While the first pre-fetch call is being executed, the second pre-fetch call may be executed and completed before or after the completion of the first pre-fetch call.

Figure 3:
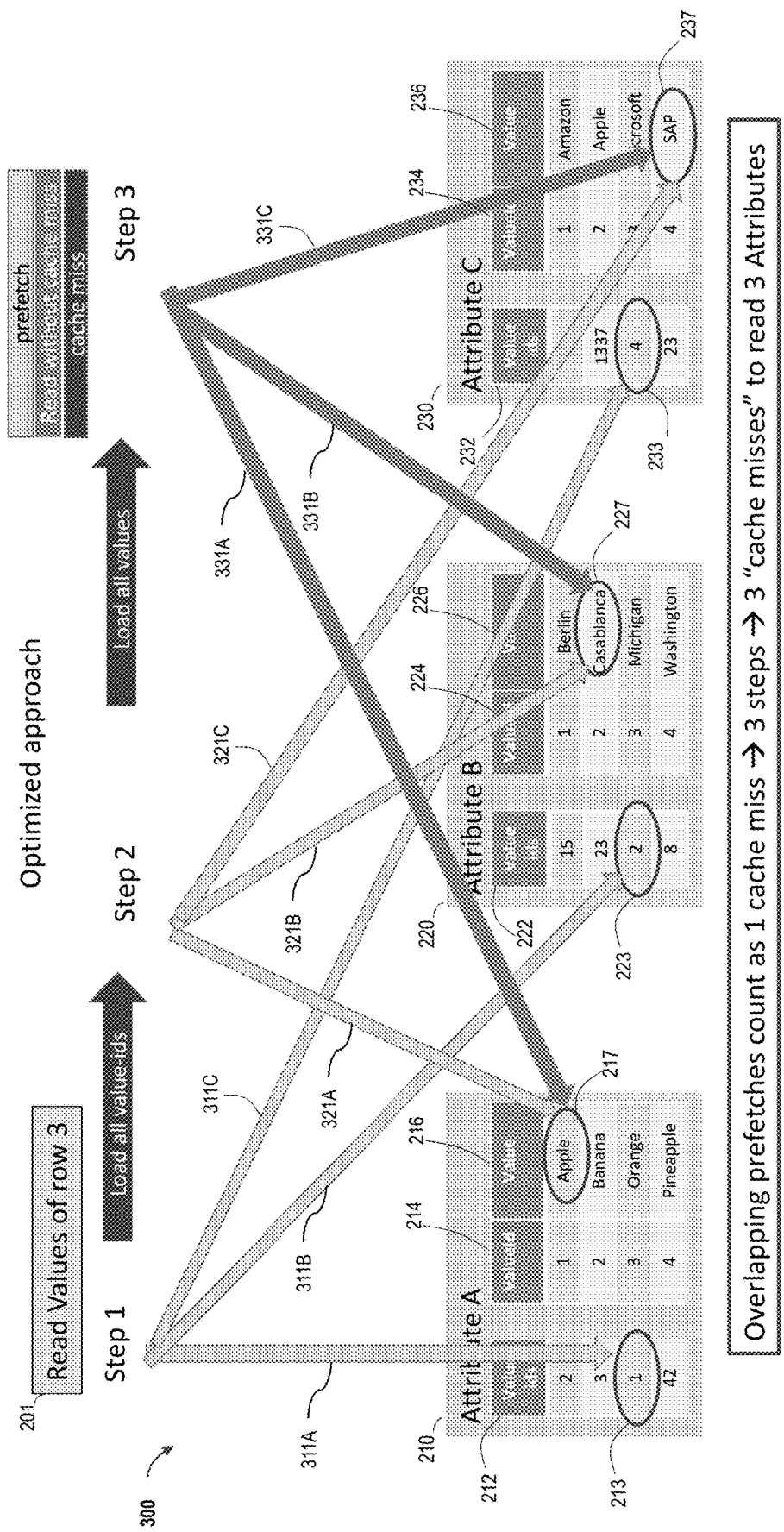
FIG. 3 depicts an example of another cache memory access, in accordance with some example implementations.

FIG. 3 depicts a diagram 300 of another cache read process of an example column store database, in accordance with some example implementations. As shown in FIG. 3, the DBMS 110, may receive the request 201 to read row 3 of the attributes 210, 220, and 230. The DBMS 110 may perform an optimized read process where instead of looping over and reading all attributes sequentially, such as attributes 210, 220, and 230, the DBMS 110 may pre-fetch data associated with attributes 210, 220, and 230 from the main memory 114 in parallel. The pre-fetched data may facilitate a more efficient cache read of the row 3 without a cache miss.

In response to the request 201, the DBMS 110 may perform a first pre-fetch from the main memory 114. The first pre-fetch may fetch index vector values from the requested row. For example, the DBMS 110 may first pre-fetch row 3 index vector values 213, 223, and 233 from index vectors 212, 222, and 232, respectively. As shown in FIG. 3, this first pre-fetch may include pre-fetch calls 311A, 311B, and 311C. In some aspects, the pre-fetch calls 311A, 311B, and 311C may be triggered sequentially and executed asynchronously. Accordingly, the retrieval of the values 213, 223, and 233 from the main memory 114 may be executed independently and in parallel without unnecessary idle time due to waiting for any of the pre-fetch calls 311A, 311B, and 311C to complete. In response to the pre-fetch calls 311A, 311B, and 311C, the index vector values 213, 223, and 233 may be loaded into cache, such as the cache 112. In some aspects, the pre-fetch calls 311A, 311B, and 311C may have a processing cost that may be similar to or equivalent to a processing cost associated with a cache miss penalty.

After the index vector values 213, 223, and 233 are fetched in parallel, the DBMS 110 may then read the physical values pre-fetched during the first pre-fetch and, based on the reading, determine which values to pre-fetch next. The DBMS 110 may then perform a second pre-fetch for the determined values from the main memory 114. In some aspects, second pre-fetch may include fetching the values 217, 227, and 237 from value columns 216, 226, and 236, respectively. As shown in FIG. 3, this second pre-fetch may include pre-fetch calls 321A, 321B, and 321C, that may be triggered sequentially and be executed asynchronously. In response to the pre-fetch calls 321A, 321B, and 321C, the column 216 values 217, 227, and 237 may be loaded into cache, such as the cache 112.

After the DBMS 110 pre-fetches the values 217, 227, and 237 in parallel, the DBMS 110 may then read the requested third row values from the cache 112. As shown in FIG. 3, the read operations 331A, 331B, and 331C may read the values 217, 227, and 237 without a cache miss.

In some aspects, using the parallel pre-fetch calls 311 and 321 the DBMS 110 may reduce a number of cache misses incurred when reading values from a result set of a column store DBMS. For example, the cache read process of diagram 200 results in a processing cost of six cache misses while the cache read process of diagram 300 results in a processing cost similar to that of three cache misses. Accordingly, reading query results from cache memory may occur twice as fast and/or involve half the processing resources when using the using the parallel pre-fetch calls 311 and 321 in FIG. 3 as opposed to sequential attribute reading as shown in FIG. 2.

In some implementations, the multiple parallel pre-fetch calls may increase computer processing overhead, but the benefits of avoiding/reducing cache miss penalties may increase overall memory and database performance. While three attributes are shown in FIGS. 2 and 3, more and/or fewer attributes are also consistent with the examples described herein. Additionally, while one type of column store dictionary compression is described herein, other types of compression, encoding, and decoding may also be applied to the embodiments described herein. The type of compression may increase or decrease the number of cache misses, and therefore, may provide more or less potential for optimization.

Figure 4:
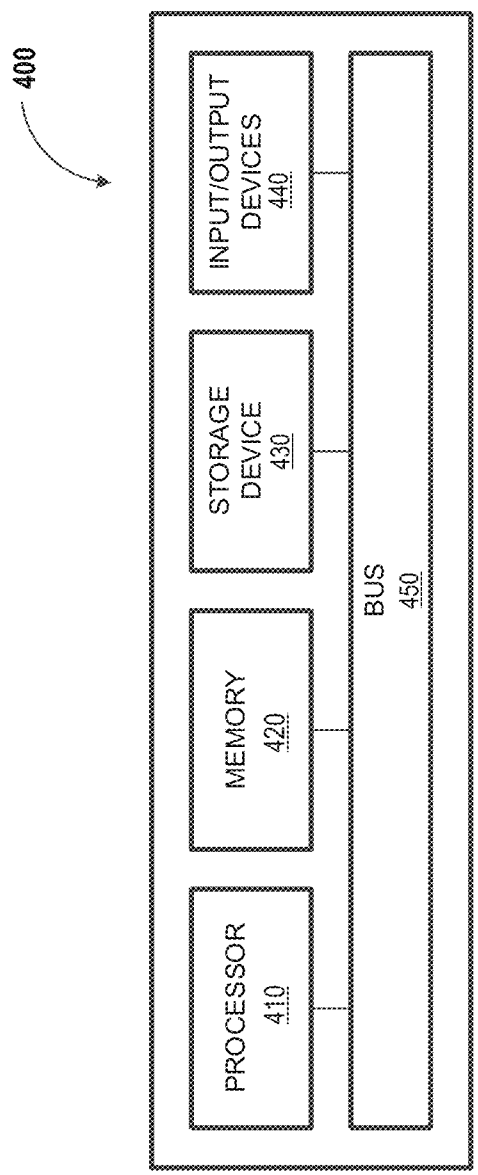
FIG. 4 depicts a block diagram illustrating a computing apparatus, in accordance with some example implementations.

FIG. 4 depicts a block diagram illustrating a computing apparatus 400 consistent with implementations of the current subject matter. Referring to FIG. 1, the computing apparatus 400 may be used to implement at least a portion of the database management system 110 and/or any components therein.

As shown in FIG. 4, the computing apparatus 400 may include a processor 410, a memory 420, a storage device 430, and input/output devices 440. The processor 410, the memory 420, the storage device 430, and the input/output devices 440 may be interconnected via a system bus 450. The processor 410 is capable of processing instructions for execution within the computing apparatus 400. Such executed instructions may be implement by one or more components of, for example, the DBMS 110. In some example implementations, the processor 410 may be a single-threaded processor. Alternately, the processor 410 may be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing apparatus 400. The memory 420 may store data structures representing configuration object databases, for example. In some aspects, the memory 420 may include the cache memory 112 and/or the main memory 114. The storage device 430 is capable of providing persistent storage for the computing apparatus 400. The storage device 430 may be a floppy disk device, a hard disk device, an optical disk device, or a tape device, or other suitable persistent storage means. The input/output device 440 provides input/output operations for the computing apparatus 400. In some example implementations, the input/output device 440 includes a keyboard and/or pointing device. In various implementations, the input/output device 440 includes a display unit for displaying graphical user interfaces.

According to some example implementations, the input/output device 440 may provide input/output operations for a network device. For example, the input/output device 440 may include Ethernet ports or other networking ports to communicate with one or more wired and/or wireless networks (e.g., a local area network (LAN), a wide area network (WAN), the Internet). The input/output device 440 may include one or more antennas for communication over the network 120 with the client device 130 and/or the cloud infrastructure platform 101.

In some example implementations, the computing apparatus 400 may be used to execute various interactive computer software applications that may be used for organization, analysis and/or storage of data in various formats. Alternatively, the computing apparatus 400 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 440. The user interface may be generated and presented to a user by the computing apparatus 400 (e.g., on a computer screen monitor, etc.).

FIG. 5 depicts a flowchart illustrating a process 500 for reducing a number of cache misses, in accordance with some example embodiments. Referring to FIGS. 1-4, the process 500 may be performed by a computing apparatus such as, the database management system 110 and/or the computing apparatus 400.

At operational block 510, the computing apparatus 400, for example, may pre-fetch a plurality of first values associated with requested data. The pre-fetching may be executed asynchronously and in response to a request for data in a column store database system. In some aspects, the request may identify a row of the column store database system associated with the requested data and the plurality of first values may be located in the row. At operational block 520, the computing apparatus 400, for example, may store the plurality of first values in a cache memory. At operational block 530, the apparatus 400, for example, may pre-fetching, asynchronously and based on the plurality of first values, a plurality of second values. At operational block 540, the computing apparatus 400, for example, may store the plurality of second values in the cache memory. At operational block 550, the computing apparatus 400, for example, may read, in response to storing the plurality of second values, the requested data from the cache memory. In some aspects, asynchronously pre-fetching the first values and/or the second values may include triggering a plurality of pre-fetch calls sequentially and executing the plurality of pre-fetch calls, for example retrieving data from main memory, in parallel. In some aspects, executing the plurality of pre-fetch in parallel involves the DBMS 110 not waiting for the results of any one of the plurality pre-fetch calls before completing a given pre-fetch call. In this way, idle time may be reduced and processing/reading speeds may be improved.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   pre-fetching, in response to a request for data in a column store database system, a plurality of first values associated with the requested data, the request identifying a row of the column store database system associated with the requested data, the plurality of first values located in the row;
pre-fetching, based on the pre-fetched plurality of first values, a plurality of second values; and
reading, from a cache memory storing the pre-fetched plurality of first values and the pre-fetched plurality of second values, the requested data including the pre-fetched plurality of first values and the pre-fetched plurality of second values.

2. The system of claim 1, the operations further comprising:
determining a first value of the plurality of first values is associated with a second value in the plurality of second values, the first value and the second value associated with an attribute of the column store database system,
wherein the pre-fetching the plurality of second values is based on the determining.

3. The system of claim 1, the operations further comprising:
receiving the request, the request identifying the row, the plurality of first columns, and the plurality of second columns of the column store database system associated with the requested data.

4. The system of claim 1, wherein the pre-fetching the plurality of first values comprises asynchronously retrieving the plurality of first values from a main memory of the at least one memory.

5. The system of claim 1, wherein the pre-fetching the plurality of first values comprises retrieving each of the plurality of first values from a different database table of the column store database system.

6. The system of claim 5, wherein the pre-fetching the plurality of second values comprises asynchronously retrieving each of the plurality of second values from a database table associated with one of the plurality of first values.

7. The system of claim 1, wherein the pre-fetching the plurality of second values comprises retrieving dictionary entries associated with the plurality of first values, wherein the plurality of first values comprise value identifiers of the dictionary entries.

8. The system of claim 1, wherein the pre-fetching the plurality of first values comprises:
triggering a first pre-fetch call and a second pre-fetch call sequentially;
executing the first pre-fetch call in parallel with the second pre-fetch call.

9. The system of claim 8, wherein the pre-fetching the plurality of second values comprises:
triggering a third pre-fetch call and a fourth pre-fetch call sequentially;
executing the third pre-fetch call in parallel with the fourth pre-fetch call.

10. A method comprising:
pre-fetching, in response to a request for data in a column store database system, a plurality of first values associated with the requested data, the request identifying a row of the column store database system associated with the requested data, the plurality of first values located in the row;
pre-fetching, based on the pre-fetched plurality of first values, a plurality of second values; and
reading, from a cache memory storing the pre-fetched plurality of first values and the pre-fetched plurality of second values, the requested data including the pre-fetched plurality of first values and the pre-fetched plurality of second values.

11. The method of claim 10, the operations further comprising:
determining a first value of the plurality of first values is associated with a second value in the plurality of second values, the first value and the second value associated with an attribute of the column store database system,
wherein the pre-fetching the plurality of second values is based on the determining.

12. The method of claim 10, the operations further comprising:
receiving the request, the request identifying the row, the plurality of first columns, and the plurality of second columns of the column store database system associated with the requested data.

13. The method of claim 10, wherein the pre-fetching the plurality of first values comprises retrieving the plurality of first values from a main memory of the at least one memory.

14. The method of claim 10, wherein the pre-fetching the plurality of first values comprises retrieving each of the plurality of first values from a different database table of the column store database system.

15. The method of claim 10, wherein the pre-fetching the plurality of second values comprises retrieving dictionary entries associated with the plurality of first values, wherein the plurality of first values comprise value identifiers of the dictionary entries.

16. The method of claim 10, wherein the pre-fetching the plurality of first values comprises:
triggering a first pre-fetch call and a second pre-fetch call sequentially; and
executing the first pre-fetch call in parallel with the second pre-fetch call.

17. The method of claim 16, wherein the pre-fetching the plurality of second values comprises:
triggering a third pre-fetch call and a fourth pre-fetch call sequentially; and
executing the third pre-fetch call in parallel with the fourth pre-fetch call.

18. A non-transitory computer readable medium storing instructions which, when executed by at least one processor, cause operations comprising:
pre-fetching, in response to a request for data in a column store database system, a plurality of first values associated with the requested data, the request identifying a row of the column store database system associated with the requested data, the plurality of first values located in the row;
pre-fetching, based on the pre-fetched plurality of first values, a plurality of second values; and
reading, from a cache memory storing the pre-fetched plurality of first values and the pre-fetched plurality of second values, the requested data including the pre-fetched plurality of first values and the pre-fetched plurality of second values.

* * * * *